United States Patent
Elizer et al.

(10) Patent No.: US 7,883,565 B2
(45) Date of Patent: Feb. 8, 2011

(54) AGRICULTURAL PELLET AND METHOD OF MAKING SAME

(76) Inventors: Mark Conley Elizer, 15550 Bellanca La., Wellington, FL (US) 33414; Ronald Walter Reed, 4043 Holly Villa Cir., Indian Trail, NC (US) 28079

( * ) Notice: Subject to any disclaimer, the term of this patent is extended or adjusted under 35 U.S.C. 154(b) by 355 days.

(21) Appl. No.: 12/250,005

(22) Filed: Oct. 13, 2008

(65) Prior Publication Data
US 2009/0145191 A1    Jun. 11, 2009

Related U.S. Application Data

(60) Provisional application No. 60/980,514, filed on Oct. 17, 2007.

(51) Int. Cl.
*C05D 9/00* (2006.01)
(52) U.S. Cl. .......................... 71/62; 71/64.13
(58) Field of Classification Search .............. 71/62, 71/64.13
See application file for complete search history.

(56) References Cited

U.S. PATENT DOCUMENTS

| | | | |
|---|---|---|---|
| 1,518,566 A * | 12/1924 | Cowles ........................ 71/61 |
| 3,630,713 A | 12/1971 | Adams et al. | |
| 3,647,416 A | 3/1972 | Messman | |
| 4,023,955 A | 5/1977 | Mueller | |
| 4,082,533 A | 4/1978 | Wittenbrook et al. | |
| 4,486,217 A | 12/1984 | Arai et al. | |
| 4,867,779 A * | 9/1989 | Meunier et al. .............. 71/62 |
| 5,030,267 A | 7/1991 | Vinaty et al. | |
| 5,037,470 A * | 8/1991 | Matzen et al. ................ 71/52 |
| 5,082,488 A * | 1/1992 | Van Mao ...................... 71/62 |
| 5,743,934 A | 4/1998 | Wommack et al. | |
| 5,997,599 A | 12/1999 | Wommack et al. | |
| 6,939,387 B2 | 9/2005 | Elizer | |

OTHER PUBLICATIONS

V.V. Matichenkov and E. A. Bocharnikova; The Relationship Between Silicon and Soil Physical and Chemical Properties; Chapter 13 pp. 209-219, Silicon in Agriculture, E.L. Danoff, G.H. Snyder and G.G. Korndorfer, 2001 Elsevier Science B.V.

* cited by examiner

*Primary Examiner*—Wayne Langel
(74) *Attorney, Agent, or Firm*—GrayRobinson, P.A.

(57) ABSTRACT

An economically efficient agricultural pellet of enhanced structural integrity comprises up to about 15% by weight of non-crystalline silica fibers blended with one or more other nutrient substances, such as calcium silicate and/or magnesium sulfite, such that the silica fibers to form an interlaced matrix dispersed throughout the body of the pellet. Fragmentation agent(s) and/or soil amendments may also be included. The silica fiber matrix provides both structural reinforcement and a source of bio-available silicon. In embodiments including calcium silicate, additional structural integrity is gained through pozzolonic bonding.

25 Claims, 2 Drawing Sheets

AGRICULTURAL PELLET AND METHOD OF MAKING SAME

CROSS-REFERENCE TO RELATED APPLICATIONS

This application claims the benefit of U.S. Provisional Application Ser. No. 60/980,514 filed Oct. 17, 2007 under 35 U.S.C. §119(e) for all commonly disclosed subject matter. U.S. Provisional Application Ser. No. 60/980,514 is expressly incorporated herein by reference in its entirety to form part of the present disclosure.

STATEMENT REGARDING FEDERALLY SPONSORED-RESEARCH OR DEVELOPMENT

Not Applicable.

INCORPORATION BY REFERENCE

Applicant expressly incorporates by reference in their entireties, as if fully set forth herein, each of the following, copies of which are attached as Addendum 1 and Addendum 2, respectively and form part of the specification of the present application:

*The Relationship between Silicon and Soil Physical and Chemical Properties* by V. V. Matichenkov and E. A. Bocharnikova, Chapter 13 pp. 209-219, *Silicon in Agriculture*, L. E. Danoff, G. H. Snyder and G. G. Korndorfer (editors) ©2001 Elsevier science B. V., and SOIL ENHANCERS, U.S. Pat. No. 6,939,387 B2 issued Sep. 6, 2005 to Mark Elizer.

FIELD OF THE INVENTION

The invention relates to the field of fertilizers for the cultivation of plants such as agricultural crops and/or grasses. More particularly, the invention relates to an economically efficient agricultural pellet which comprises a desired base composition comprising a plurality of discrete non-crystalline silica fibers and at least one cultivationally beneficial substance which are combined such that the silica fibers form a matrix of non-crystalline silica fibers which reinforce the pellet, enhancing its structural integrity of the pellet as well as providing bio-available silicon to serve as an additional nutrient. Cultivationally beneficial substances which may be included in the pellet include, by way of non-limiting examples, organic and/or inorganic nutrients, such as calcium silicate, nutritionally participating binders, such as magnesium sulfite, nutritionally non-participating binders such as Portland cement, soil amendments, such as gypsum, and fragmentation agents, such as expandable clay. In embodiments in which the agricultural pellet includes calcium silicate and/or other suitable substance for reacting with the silica fibers to form pozzolonic bonds, the silica fiber matrix lends further physical strength to the pellet by providing pozzolonic bonding of pellet constituents. The silica fiber matrix also provides, or augments, controlled-release properties which can altered by varying the proportion of non-crystalline silica fiber present and/or by incorporating other release control agents, such as expandable clay.

BACKGROUND OF THE INVENTION

In the prior art, controlled release of soil nutrient additives has generally accomplished by use of fertilizer pellets in which a nutrient composition is either encapsulated within a special release control coating whose makeup differs from that of the interior of the pellet and/or in which the body of the pellet is powdered, granular, liquid, gel or semi-liquid bonding agent intended to maintain the structural integrity of the pellet.

For example, it is known to form agricultural pellets by blending various nutrient containing substances such as mineral slag, clays, mining waste processed sewerage sludge, urea, animal manure, phosphates and/or manufactured chemicals with various binders such as Portland cement, magnesium sulfate, lignin, Methacel® and/or organics such as sugar or molasses. While Portland cement is effective as a binding to reduce premature pellet disintegration, it is a relatively heavy material and contributes negligible, if any, nutrient value. The use of Portland cement, or other nutritionally "nonparticipating" binders, is undesirable from the standpoint that such materials entail costs not only for initial pellet production but also for packaging, handling, shipping and distribution in exchange for little, if any nutrient benefit. Accordingly, the economic efficiency of such agricultural pellets is somewhat undesirable.

As noted above, it is also known to coat fertilizer pellets with encapsulating materials such as sulfur or plastics which disintegrate at an at least somewhat predictable rate in the preserve of environmental factors such as water and/or biological agents typically present in said encapsulation and conventional incorporated binders. Both help, to maintain the shape of pellets while retarding the release of water-soluble nutrients contained within the pellet. See for example U.S. Pat. No. 3,630,713; U.S. Pat. No. 3,647,416; U.S. Pat. No. 4,023,955; U.S. Pat. No. 4,486,217; U.S. Pat. No. 4,082,533, and U.S. Pat. No. 5,030,267.

U.S. Pat. No. 6,939,387 describes the role of silicon (Si) in the growth of plants and the benefits of providing supplemental silicon sources, especially in the case of certain commercially important crop species, such as rice and sugar cane, which take in substantial amounts of silicon from the soil. Silicon supplementation through application of calcium silicate ($CaSiO_2$), and magnesium-enhanced calcium silicate, has also been found to be highly beneficial in the cultivation of certain grasses such as St. Augustine grass, Bermuda grass, bent grass, rye grass, and other grasses used on golf courses, residential and commercial lawns. The '387 patent discloses a pelletized soil enhancer comprised of calcium silicate ($CaSiO_3$) and magnesium sulfite ($MgSO_3$) for increasing the amount of calcium, silica, magnesium, and potassium available for uptake by growing plants. The pellet may also include expandable clay which aids pellet disintegration upon exposure to sufficient moisture. The mechanical integrity of the pellets disclosed in the '387 patent is attributable principally to the inclusion of magnesium sulfite and/or organic binders.

Water-disintegrable fertilizer pellets formed from cement kiln dust and a water-soluble binder are disclosed in U.S. Pat. Nos. 5,743,934 and 5,997,599 to Womack et al. primary plant nutrients, secondary plant nutrients (magnesium, sulfur and/or calcium), and/or micronutrients (iron, copper etc.) may also be present in the pellets. At least 15% of the resulting pellet is from a calcium source, such as kiln dust, lime, limestone, or gypsum. This results in a pellet having only with a small amount of bio-available silicon. The small quantity of silica in the pellet provides insufficient silicon for efficient uptake of nutrients by various types of plants, particularly those requiring copious amounts of silicon. Consequently, application of large quantities of such pellets would be necessary to provide sufficient amounts of silica for such species.

Fertilizer pellets according to the prior art are commonly formed by blending nutrient-containing compounds with Portland cement, magnesium sulfate, lignin, and organics. The blend is fed to a rotating disc pelletizer together with sufficient moisture to form pellets of controlled size. The pellets are then cured and strengthened in a dryer. During drying, significant pellet attrition occurs as a result of mechanical breakage. As much as ten percent 10% of the pelletized feed material from the pelletizer may break during the drying operation alone. This substantial percentage of broken fragments is typically separated from the remaining unbroken pellets using a mesh screener. The fragments can be, and typically are, reprocessed but at the expense of both remanufacturing cost and decreased overall production yield.

Pellet breakage occurs during packaging, shipping, handling and end use application. Breakage occurring during any post-manufacturing stage interferes with efficient and uniform pellet application and compromises the designed time release characteristics of the pellet. Nutrient release by pellet fragments is accelerated to a degree which is relatively unpredictable depending on such variables as the number of broken pellets and applied to the crop and the size of those broken fragments. Fragmentation of pellets can also form dust which can become airborne and contaminate facilities and equipment. Such dust can also be inhaled if appropriate precautions are not taken.

Efforts to prevent pellet breakage by increasing the proportion of plasticized coatings, Portland cement or other conventional binders, and/or by adding thicker layers of encapsulating coating, in attempt to further strengthen the pellets, increases manufacturing cost and reduce the availability of nutrient content per unit weight of the pellets. Consequently, a greater overall weight of pellet material must be packaged, shipped handled and applied in order to deliver a given amount of nutrient to a given crop. Accordingly, if used at al, it is desirable to minimize the proportion of Portland cement or other nutritionally non-participating binders in an agricultural pellet.

Although prior art fertilizer pellets have generally been effective to some degree in retarding nutrient release, there is a need for an agricultural pellet which is not only effective to predictably control the release of nutrients but is also more economical to manufacture, package, ship and apply than agricultural pellets of the prior art.

There is also a need for an agricultural pellet which, in addition to the foregoing desirable characteristics also provides a significant source of bio-available silicon.

There is also a need for an agricultural pellet which not only provides all of the foregoing characteristics but also can provide for an accelerated release of nutrients through the incorporation of a fragmentation agent, such as an expandable clay.

SUMMARY OF THE INVENTION

In a preferred embodiment, an agricultural pellet according to the invention comprises about 15% by weight of non-crystalline silica fibers blended with a composition. The fibers form a three-dimensional matrix which is distributed throughout the body of the pellet and serves several useful functions. The fiber matrix enhances the structural integrity of the pellet by providing mechanical reinforcement. The silica fibers also provide a source of bio-available silicon which may serve as a plant nutrient. In certain embodiments, composition of the pellet may be such that in addition to providing mechanical reinforcement, the silica fibers react with, and pozzolonically bond to, one or more other constituents to provide pozzolonic bonding of the body of the pellet. The interlaced silica fiber matrix reduces pellet breakage during shipping, handling and spreading. The mechanical reinforcing effect of the fibers can be increased or decreased as the proportion of fibers is increased or decreased thereby modulating the controlled release properties of the pellet. Nutrient release control properties which can altered either by varying the proportion of non-crystalline silica fiber present and/or by incorporating other release rate control agents, such as expandable clay.

Preferably, the fibers are derived from low alkali, amorphous, vitreous sources in order to control chemistry and to preclude exposure to acutely hazardous crystalline fibers during manufacturing or handling. Suitable non-crystalline silica fibers may be delivered by processing glass strand material available as a waste byproduct of glass production. A preferred form of fiber is derived by selective crushing and classifying of waste fiberglass strand material to provide acicular particles having an aspect ratio of about 3:1 or greater. The fibers in such form are blended with the base nutrient composition and any other pellet constituents prior to pelletizing and drying.

In a preferred embodiment which is particularly advantageous for use with certain turf grasses, sugar cane, rice and other plant species having substantial requirements for silicon, the nutrients incorporated in the pellet, along with the silica fiber, include calcium silicate.

According to further alternative embodiments, the pellet may further incorporate magnesium sulfite, along with both the silica fiber, and calcium silicate. The magnesium sulfite both acts as a binding agent and combines with the calcium silicate to form a magnesium-enhanced calcium silicate (MgCS) which, as described in the '387 patent has particularly desirable characteristics in certain applications.

In addition to silica fiber and the constituents of the various embodiments mentioned above, other embodiments agricultural pellets according to the invention may include gypsum or other said amendments.

Still further embodiments of an agricultural pellet according to the invention may additionally comprise attapulgite clay (expandable clay), which serves to accelerate physical disintegration of the pellet in response to absorption of moisture, thereby accelerating nutrient release in a manner which can altered by increasing or decreasing the proportion of clay present.

These and other features and advantages of the agricultural pellet of the invention, and a preferred method for producing such pellets on a commercial scale, are described in further detail below.

DETAILED DESCRIPTION OF PREFERRED EMBODIMENTS

Figure 1:
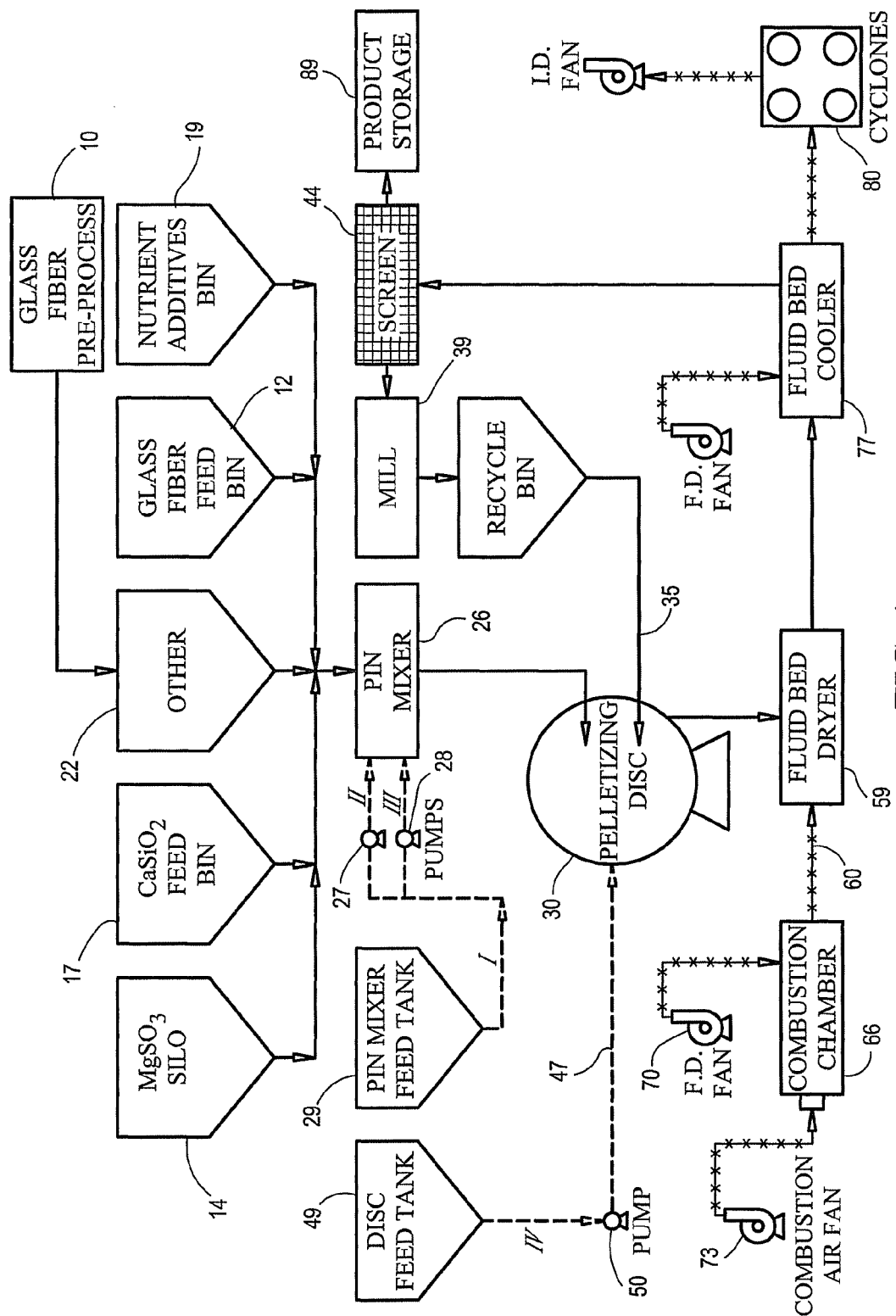
FIG. 1 is a process flow diagram depicting a preferred process for making an agricultural pellet according to the present invention.

An agricultural pellet according to the invention is comprises non-crystalline silica fibers blended with at least one or more other nutrient substances such that the silica fiber is substantially evenly distributed throughout the body of the pellet to provide an interlaced, three-dimensional mechanical matrix in which the silica fibers are substantially randomly directionally oriented. This silica fiber matrix serves as a source of bio-available silicon mechanically reinforces the pellet to reduce premature mechanical breakage during manufacture, packaging, shipment and spreading. In certain preferred embodiments, the agricultural pellet comprises both silica fiber and calcium silicate. The latter not only provides additional bio-available silicon, but also reacts pozzolonically with the silica fibers to impart additional structural strength to the pellet. If desired, one or more other, nutritionally participating or non-participating, binding agents, such as Portland cement and/or others such as those mentioned above, can also be included as can soil amendments such as gypsum.

Certain embodiments of the invention also include a fragmentation agent, such as a hydroscopic, expandable clay which serves to accelerate beneficial pellet the fragmentation in response to exposure to elevated environmental moisture levels encountered after spreading.

Suitable silica fiber for use in agricultural pellets of the invention can, by way of example, derived from waste fiberglass strand material of the type which is commonly generated in the course of conventional fiberglass production processes and is readily available from fiberglass producers. Use of such material for agricultural pellets according to the invention, represents an economically and environmentally beneficial alternative to the conventional practice of disposing of the material as waste. A preferred form silica fiber material can readily be derived from low alkali, amorphous vitreous sources, with minimal pre-processing. Before blending with other pellet constituents, strands of the fiberglass waste material are preferably chopped to an initial length of about three inches 3" or less in a low speed/high torque shredder. In the course of pellet production as further described below, the waste fiberglass strand material is further fragmented to form acicular particles, preferably of about 3:1 or greater, aspect ratio, which are incorporated in the pellet to form the silica fiber matrix described above.

As will be described in further detail below, the shredded fiber is subsequently fed to a pin mixer or closed circuit rotary or vibratory ball mill and shape classifier together with controlled quantity additions of plant nutrients such as calcium silicate, magnesium sulfite and/or others, in the course of which, at least the substantial bulk of the fiber strands are reduced to elongated particles of relatively high axial to diametrical aspect ratio; preferably about 3:1 or greater. The fiber/nutrient blend is mixed with liquid, preferably water, and optionally, with one or more additional bonding agents, prior to being sequentially pelletized, dried, and optionally, classified according to pellet size. In alternative embodiments, expandable clay may be added to the glass fiber/nutrient blend prior to pelletizing.

In a preferred embodiment of the invention, waste fibers from the manufacture of low alkali commercial glass fibers production (Table 1) are sequentially shredded, crushed and classified to produce a fibrous material of high aspect ratio and having an average axial length of preferably less than about five hundred microns (500 μm) and an average width of preferably of less than about fifty microns (50 μm). The silica fibers are blended with various percentages of calcium silicate slag, magnesium sulfite, expandable clay (0-2%) and water (2-10%). The compositionally controlled mixture is blended, pelletized and dried to a desired residual moisture content prior to packaging and shipment. Optionally, the dried pellets are screened to separate intact pellets from broken fragments for reprocessing, and/or to sort intact pellets by size.

Table 1 sets forth exemplary constituents of embodiments of agricultural pellets in accordance with the present invention. In each case, at least some silica fiber, residual moisture and one or more of the following are included in any combination or sub combination totaling one hundred weight percent (100% wt): calcium silicate, magnesium sulfite, expandable clay, other nutrients/soil amendments.) Subject to the foregoing, the nutrient composition of the pellet can be tailored to provide a desired nutrient for a particular use. In order to increase the rate of nutrient release, the proportions of one or more of silica fiber, magnesium sulfite and/or expandable clay in the composition can be increased within the ranges specified below. Conversely, in order to decrease the rate of nutrient release, expandable clay is preferably omitted entirely and lesser proportions of silica fiber and/or magnesium sulfite are included.

TABLE 1

| | |
|---|---|
| Calcium Silicate | about 25%-80% (wt) |
| Magnesium Sulfite | about 5%-20% (wt) |
| Silica Fiber | up to about 15% (wt) |
| Expandable Clay | about 1%-3% (wt) |
| Residual moisture | about 2%-4% (wt) |
| Other Nutrients and/or soil amendments | 0%-50% (wt) |

The silica fiber provides the pellet with structural strengthening that reduces the percentage amount requirement of magnesium sulfite or other binding agents. The fiber adheres to the calcium silicate present in the pellet forming a pozzolonic bond, thus further strengthening the pellet. The reaction rate of the pozzolonic bonding reaction is sufficiently slow that such pellets will continue to gain strength even after manufacture. Since the silica fiber contains soluble silica, the pellet will provide at least some bio-available silicon as a plant nutrient, even if no other constituents containing silicon are included. It is estimated that each one additional one percent (1% wt) of silica fiber present in the composition reduces the amount of magnesium sulfite or other binding agent needed by approximately two percent (2% wt).

The use of attapulgite clay (expandable clay), such as minugel, in certain embodiments provides a mechanical mechanism to break apart the fertilizer pellet once it is in the presence of water. Water penetrates the pellet and causes the clay to expand, thereby fracturing the pellet and exposing an increased surface area of the pellet composition to the soil. A relatively rapid physical disintegration of the pellet after spreading is particularly desirable in certain applications, such as golf course greens. Other dispersion agents are commercially available; however they are generally not considered to be as cost effective as expandable clay.

As discussed in the '387 patent, the incorporation of magnesium sulfite and calcium silicate in the pellet is desirable. The magnesium sulfite serves in its own right as binding agent. Moreover, the combination of magnesium sulfite with calcium silicate acts synergistically to enhance the uptake of silicon by the plant.

Residual water content of the pellet is necessary in the granulation processes because a pellet with near zero water content will produce a pellet with inferior strength. Excessively high water content in the pellet will reduce the available content for nutrients as well as inviting the growth of mold and mildew problem and fostering premature pellet disintegration.

Additional nutrients used in agricultural pellets according to the invention may be organic and/or inorganic in nature. Examples of suitable organic nutrients which may be incorporated include, without limitation, pasteurized poultry manure, processed sewage sludge, organic compost, peat, bone meals, dried blood, rock phosphate, and iron humate.

Inorganic substances which may suitably be utilized include, without limitation, sulfate of potash, methylene urea, Epsom salts, and diammonium phosphate.

Soil amendments which can also be incorporated in agricultural pellets according to the invention include not only expandable clays as described above but also substances such as gypsum to improve soil texture and water percolation as well as lime or acidifiers for adjusting soil pH.

Referring now to FIG. 1 a preferred embodiment of a process for producing agricultural pellets according to the present invention will now be described.

In order to assure proper feeding and processing of silica fibers in subsequent manufacturing operations, it is desirable to reduce longer strands of waste fiberglass material to shorter strands in a preprocessing operation (10) prior to delivering them to a glass fiber feed bin (12) for blending with other pellet constituents. Strands of the raw fiberglass waste material are preferably chopped to an initial length of about three inches 3" or less in a low speed/high torque shredder. Depending on the particular agricultural pellet embodiment to be produced in accordance with Table 1 and the foregoing description, a magnesium sulfite feed bin (14), and calcium silicate feed bin (17), a bin (19) for additional nutrients, and a bin (22) for other constituents, such as expandable clay and/or soil amendments, can be provided as shown.

Calcium silicate is available at reasonable cost in the form of calcium silicate slag, a mining byproduct which does not contain high levels of metals, such as aluminum and iron, which are capable of binding with silica. Iron and aluminum preferably constitute less than about 10% by weight of the calcium silicate slag. Commercially available calcium silicate slags have varying chemical characteristics. For example, a typical calcium silicate slag produced as a waste product from the production of elemental phosphorus typically contains about 27-31% (wt) of Ca, about 41-44% (wt) $SiO_2$, about 2-2.6% (wt) Al, and about 0.2% (wt) Fe.

Magnesium sulfite may suitably be provided in the form of a magnesium sulfite by-product obtained from coal-fired electrical power generation plants. In such power plants, flue gas containing sulfur dioxide is produced. The flue gas is scrubbed with magnesium oxide and magnesium sulfite is produced as a byproduct. This by-product typically contains about 51-54% (wt) of $MgSO_3$, about 24-27% (wt) $MgSO_2$, and about 13-16% (wt) sulfur trioxide (complexed with $MgSO_3$, and $MgSO_2$).

As represented by the arrows emanating from feed bins (12), (14), (17), (19) and (22), the ones of those constituents desited for a particular pellet composition are metered, into a pin mixer (26) in which the constituents are blended in the presence of water provided by way of metering pumps (27) and (28) from a feed tank (29). Advantageously, the water may be mixed with a surfactant, such as an anionic surfactant, which acts as a wetting agent to help reduce the amount of water needed to achieve rapid and uniform wetting, thus minimizing both the time and energy cost associated with drying the pellets during subsequent processing described below. Although other types of mixers, such as ribbon mixers can be used, a pin mixer is preferred because it initiates the agglomeration of particles thereby decreasing the amount of time necessary for the material to be processed by a disc pelletizer (30) in order to form pellets of a given desired size. Depending on their intended application. pellets of average size ranging from about minus six (−6) mesh to about twelve (12) mesh are useful, with those of about eight (8) mesh presently being preferred for most applications.

Material exiting the pin mixer (26) is transported into the disc pelletizer (30). Optionally, the disc pelletizer (30) may receives a supply of recycled pellet material (35) which has been crushed by a mill (39) after being received as fallout from a mesh screener (44) or other device for classifying according to their size finished agricultural pellets at the tail end of the production process. As shown in FIG. 1, the disc pelletizer (30) also receives a metered input (47) of liquid material from a feed tank (49) by way of a metering pump (50). This liquid may also suitably consist of only water, or a mixture of water and a surfactant. However, it is to be noted that other liquids, may also be added by way of pumps (50) and/or (27) and (28). For example, in the event the desired blend of nutrient substances includes urea, ammonia, or any other substance in liquid form, or semi-liquid form, such as chicken manure, may also be included in the liquid fed from feed tanks (29) and/or (49) whereas feed bins (12), (14), (17), (19), and/or (22) generally supply their respective substances in dry, granular or powdered, forms. As the disc pelletizer (30) rotates, the moistened material present therein is formed into particles. Depending on residence time within disc pelletizer (30), the average size of those particles may range from about six mesh (6 mesh) to about forty mesh (40) mesh as may be desired according to the particular intended application for which the agricultural pellets are produced.

Moist pelletized particles discharged from the disc pelletizer (30) are then dried and cured. Drying and initial curing is preferably carried out by means of a fluid bed dryer (59) which receives a flow (60) of hot dry air delivered from a heat source such as a gas-fired, or fuel oil fired, combustion chamber (66) which communicates with a forced draft fan (70) and a combustion air fan (73). Inside fluid bed dryer (59), the pellets are preferably subjected to a temperature of between about 550° F. and about 600° F. for between about approximately 2 to 8 minutes, depending on pellet size, or otherwise as required to dry the pellets to a desired residual moisture content. Preferably, the residual moisture content of finished pellets ranges from about two to four weight percent (2-4% wt).

Pellets exiting the dryer (59) are transferred to a cooler (77), such as a fluid bed cooler in which they are cooled with the flow of ambient air until they reach a temperature of about 170 to 180° F. Gas exiting the cooler (77) can be fed to cyclones (80) to remove small particles which can be recycled into the disc pelletizer (30) as part of the recycled material supply (35).

Pellets exiting the cooler (77) are transferred to a mesh screen classifier or other process for classifying the finished pellets according to their size. When sorted by size, the finished agricultural pellets may be transferred to product storage, either in bulk, or packaged in sacks or other containers for distribution and shipment to end-users.

Figure 2:
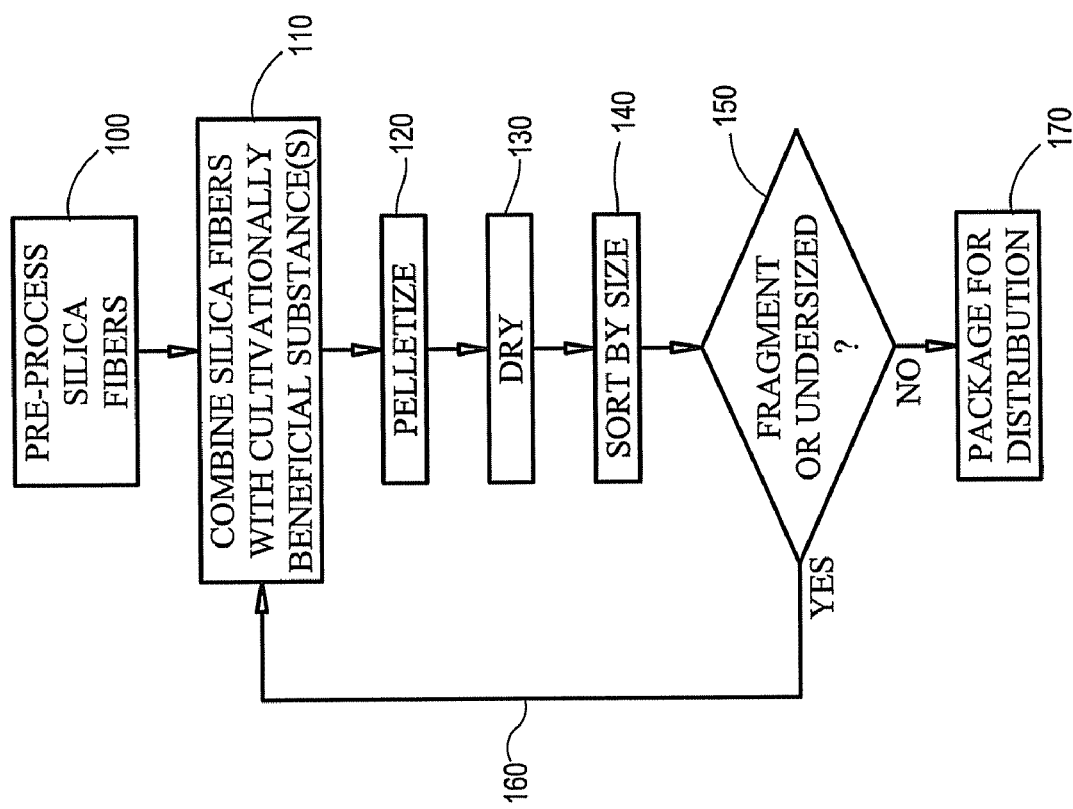
FIG. 2 is a flow chart illustrating the steps of a preferred method for making an agricultural pellet according to the present invention.

Referring now to FIG. 2 a preferred embodiment of a method of making an agricultural pellet according to the present invention will now be described.

If required, long silica fibers are preprocessed in a step (100) by being chopped, crushed and or otherwise reduced to fibers of a more manageable length for further processing. By way of example, the silica fibers are preferably reduced to an average length not to exceed about three inches (3").

In a combining step (110), silica fibers are combined with at least one other cultivationally beneficial substance to form a pellet composition.

In a pelletizing step (120), the pellet composition is formed into and discrete pellet. If desired, the combining step (110) and the pelletizing step (120) can be carried out as a single step in which the silica fibers and some or all of the other constituents of the pellet composition are initially combined in pelletizer (30) without first mixing them in pin mixer (26).

As noted above, during at least one of the combining step and the pelletizing step, the silica fibers are reduced to a desired final size and are distributed throughout the body of the pellet to form a like a fiber matrix as described in further detail above. In addition, at least one of the combining step and the pelletizer and step are carried out with the addition of moisture to the pellet composition. As an aid to providing thorough and uniform moisturizing of the pellet composition. A wetting agent, such as a surfactant is preferably added with the moisture, which may suitably comprise water. It is to be noted that, in embodiments where calcium silicate or other substances capable of reacting with the silica fibers to form pozzolonic bonds, the pozzolonic bonding reaction is initiated upon the addition of moisture to the pellet composition.

In a drying or curing step (130), the pelletized pellet composition is dried to a desired moisture content. The drying step (130) is preferably carried out at an elevated temperature. If desired, a drying step may be followed by an optional cooling step (not shown).

In an optional sorting step (140) the dried agricultural pellets are sorted by size.

In an optional recycling step (150), (160), fragmented or undersized pellets are recycled for reuse in combining step (110). Recycling step (150) preferably includes a substep of crushing, milling or otherwise reducing the undersized pellets and or pellet fragments to a size suitable for reuse in combining step (110).

In an optional packaging step (170) the glass fiber reinforced agricultural pellets according to the present invention are packaged for distribution. The packaging step can be carried out by way of example by packaging the agricultural pellets in sacks or other containers, preferably of a moisture-resistant variety. Alternatively, the packaging step (170) and be carried out by loading the agricultural pellets into freight cars or other bulk shipping containers. The optional packaging step (170) may optionally be preceded and/or succeeded by an optional storage step (not shown).

The foregoing describes certain preferred and alternative embodiments of the present invention. It is to be understood that the invention is not limited to the particular embodiments described. In light of the present disclosure, various other embodiments will be apparent to persons skilled in the art. Accordingly, it is to be recognized that changes can be made without departing from the scope of the invention as particularly pointed out and distinctly claimed in the appended claims which are to be construed to encompass all legal equivalents thereof.

What is claimed is:

1. An agricultural pellet, comprising:
at least some, but not more than about 15% by weight, of non-crystalline silica fibers, blended with at least one other cultivationally beneficial substance such that the silica fibers form a three-dimensional matrix dispersed throughout the body of the pellet.

2. The agricultural pellet of claim 1 wherein said silica fibers comprise a plurality of fiber strands having an aspect ratio of about 3:1 or greater.

3. The agricultural pellet of claim 1 wherein said silica fiber matrix comprises a plurality of substantially randomly directionally oriented silica fibers.

4. The agricultural pellet of claim 1 wherein said at least one other cultivationally beneficial substance comprises calcium silicate.

5. The agricultural pellet of claim 1 wherein said at least one other cultivationally beneficial substance comprises magnesium sulfite.

6. The agricultural pellet of claim 1 wherein said at least one other cultivationally beneficial substance comprises calcium silicate and magnesium sulfite.

7. The agricultural pellet of claim 1 wherein said at least one other cultivationally beneficial substance comprises a substance which reacts with said silica fibers by way of a pozzolonic bonding reaction.

8. The agricultural pellet of claim 1 wherein said at least one other cultivationally beneficial substance comprises an expandable fragmentation agent.

9. The agricultural pellet of claim 8 wherein said fragmentation agent comprises an expandable clay.

10. The agricultural pellet of claim 1 wherein said silica fibers comprise low alkali glass fibers derived from a waste by-product of a fiber glass production process.

11. A method of making an agricultural pellet, said method comprising the steps of:
(a) combining a plurality of non-crystalline silica fibers with at least one other cultivationally beneficial substance to form an agricultural pellet composition, and
(b) forming said pellet composition into at least one pellet.

12. The method of claim 11 wherein at least one on said combining step and said pellet forming step is carried out with the addition of moisture to said pellet composition.

13. The method of claim 12 further comprising the step of drying said pellet to a predetermined moisture content.

14. The method of claim 12 further comprising the step of sorting said at least one pellet according to size.

15. The method of claim 14 further comprising the step of recycling fragmented and/or undersized pellets for use in said combining step.

16. The method of claim 15 further comprising the step of packaging said at least one pellet for distribution.

17. The method of claim 1 wherein said silica fibers comprise not more than about 15% by weight, of said pellet composition.

18. The method of claim 1 wherein said silica fibers comprise strands having an aspect ratio of about 3:1 or greater.

19. The method of claim 1 wherein at least one on said combining step and said pelletizing step are carried out so as to form said silica fibers into a matrix comprising a plurality of substantially randomly directionally oriented ones of said silica fibers distributed substantially throughout said pellet.

20. The method of claim 1 wherein said at least one other cultivationally beneficial substance comprises calcium silicate.

21. The method of claim 1 wherein said at least one other cultivationally beneficial substance comprises magnesium sulfite.

22. The method of claim 1 wherein said at least one other cultivationally beneficial substance comprises calcium silicate and magnesium sulfite.

23. The method of claim 1 wherein said at least one other cultivationally beneficial substance comprises a substance which reacts with said silica fibers by way of a pozzolonic bonding reaction.

24. The method of claim 1 wherein said at least one other cultivationally beneficial substance comprises an expandable fragmentation agent.

25. The method of claim 1 wherein at least some of said silica fibers comprise low alkali glass fibers derived from a waste by-product of a fiber glass production process.

* * * * *